United States Patent [19]
Bocko et al.

[11] Patent Number: 4,645,524
[45] Date of Patent: Feb. 24, 1987

[54] METHOD FOR MAKING SODIUM-CONTAINING GLASS

[75] Inventors: Peter L. Bocko, Painted Post; David A. Thompson, Big Flats; William J. Wein, Corning, all of N.Y.

[73] Assignee: Corning Glass Works, Corning, N.Y.

[21] Appl. No.: 725,928

[22] Filed: Apr. 22, 1985

[51] Int. Cl.[4] .............................................. C03B 23/20
[52] U.S. Cl. ...................................... 65/18.1; 65/18.2; 65/DIG. 16; 65/3.12
[58] Field of Search ...................... 65/3.12, 18.1, 18.2, 65/21.4, DIG. 16; 501/30, 59; 423/342, 464

[56] References Cited

U.S. PATENT DOCUMENTS

| | | | |
|---|---|---|---|
| 3,883,336 | 5/1975 | Randall | 65/18.2 |
| 4,021,253 | 5/1977 | Budrick et al. | 501/30 |
| 4,260,406 | 4/1981 | Corbett et al. | 501/59 |
| 4,378,987 | 4/1983 | Miller et al. | 65/3.12 |
| 4,472,510 | 9/1984 | January | 65/18.2 |
| 4,501,602 | 2/1985 | Miller et al. | 65/18.2 |
| 4,557,561 | 12/1985 | Schneider et al. | 65/DIG. 16 |

FOREIGN PATENT DOCUMENTS

| | | | |
|---|---|---|---|
| 5632344 | 4/1981 | Japan | 65/18.2 |
| 59-184740 | 10/1984 | Japan | 65/DIG. 16 |

Primary Examiner—S. Leon Bashore
Assistant Examiner—Michael K. Boyer
Attorney, Agent, or Firm—K. van der Sterre

[57] ABSTRACT

A method for producing sodium-containing glasses, by a vapor deposition process wherein a vapor mixture containing a sodium fluoroalkoxide compound is reacted to provide a particulate sodium-containing vapor deposition product which can be sintered to a glass.

7 Claims, 3 Drawing Figures

METHOD FOR MAKING SODIUM-CONTAINING GLASS

BACKGROUND OF THE INVENTION

The present invention is in the field of glass and ceramic manufacture and particularly relates to vapor deposition methods for the manufacture of glasses and ceramics containing sodium.

In the field of conventional oxide glass manufacture, and particularly for the manufacture of silicate glasses, sodium is one of the oldest and most important fluxes known. As a flux, it acts to aid the melting process and to reduce the softening point of glasses so that they can be melted and formed at lower temperatures.

While sodium is typically present in significant quantities, e.g. 10–20% $Na_2O$ by weight, in common window and bottle glasses (referred to as soda-lime glasses and consisting mainly of $Na_2O$, CaO and $SiO_2$), it is also an essential minor constituent in numerous other commercial silicate and non-silicate glasses. Examples of glass types containing $Na_2O$ are low-expansion alkali borosilicate glasses for pharmaceutical and laboratory glassware, alkali borosilicate sealing glasses for joining glass and metal parts, lead silicate glasses for lamp and vacuum tube envelopes, and silicate optical glasses for chemically strengthenable ophthalmic lenses.

Sodium can also be present as a flux in non-silicate oxide glass systems such as in phosphate and germanate glasses. And sodium has been included as an essential constituent in certain pure sodium borosilicate glasses recently utilized for the fabrication of low-loss optical waveguide glasses. For this application, highly pure sodium-containing batch materials which minimize the presence of light absorbing impurities are needed.

In addition to its utility as a flux in oxide glasses, sodium has also been used as a constituent of non-oxide glasses. Thus, for example, in the preparation of halide glasses of high purity for possible use in the manufacture of infrared transmitting optical fibers, sodium fluoride or other sodium halides may be useful as modifiers to control the optical, melting and forming properties of the halide glasses. Again, however, sodium source materials of very high purity will be required.

For specialty glass and ceramic applications, such as in the manufacture of optical fiber glasses, stringent purity requirements favor the utilization of vapor deposition methods for the production of the needed materials. Such methods depend upon the availability of suitable volatile source compounds which can be purified to the requisite degree, thereafter vaporized at temperatures readily maintained in vapor delivery systems and, most preferably maintained at vaporization temperatures for extended periods without decomposition.

Chemical vapor deposition reactions for the commercial production of glasses for optical fibers presently rely on the volatile source compound $SiCl_4$ and, depending upon the selected composition for the glass, on $GeCl_4$ and $POCl_3$, each of which can be efficiently vaporized, stably transported, and rapidly oxidized in the vapor state to the respective oxides $SiO_2$, $GeO_2$, and $P_2O_5$. However, the demand for improved glass compositions for advanced optical and other specialty glass applications has stimulated work to develop new stable and volatile source compounds for vapor phase glass manufacture. Such manufacture may extend not only to new oxide glasses containing oxides of elements not previously transportable in the vapor phase, but also to halide and other glass compositions in which very high purity is desired.

Sodium is an example of an element which is difficult to supply in the vapor phase using conventional vapor delivery techniques and equipment. U.S. Pat. No. 3,883,336 describes an aerosol technique by which glasses containing sodium and other elements not available as volatile source compounds could be manufactured. According to that method, solutions of non-volatile source materials are introduced into a flame reaction zone where they are oxidized and codeposited with other oxide constituents and subsequently fused to a glass. However, since this method utilizes non-volatile source materials and a carrier solvent, some of the purification advantages of vapor-phase delivery are lost.

U.S. Pat. No. 4,501,602 describes a vapor-phase method for glass manufacture utilizing a variety of organometallic compounds, including a sodium beta-diketonate compound which sublimed at 260° C. However, for vapor-phase glass manufacture wherein glasses containing sodium are to be produced in commercial quantities, even more volatile and stable sodium compounds would be desired.

It is therefore a principle object of the present invention to provide a process for manufacturing pure glass or ceramic products containing sodium, whether oxides, halides, or other forms of this element, wherein the advantages of vapor phase processing can be more effectively realized.

It is a further object of the invention to provide a vapor phase glass manufacturing method adaptable to the manufacture of $Na_2O$-containing glasses wherein vaporizable sodium compounds of enhanced volatility and stability are used.

It is a further object of the invention to provide a chemical vapor deposition process for the manufacture of pure fused silica or silica-containing glasses wherein sodium can be introduced into the glass using a volatile organometallic compound of sodium.

Other objects and advantages of the invention will become apparent from the following description thereof.

SUMMARY OF THE INVENTION

The present invention provides an improved method for making sodium-containing glasses and ceramics by a vapor deposition process. The method avoids the use of liquid solvent carriers and non-volatile sodium salts, and therefore avoids the main avenues for impurity contamination present in most prior art processes.

Briefly, the method of the invention involves the use of a sodium fluoroalkoxide compound as a sodium vapor source for vapor-phase glass or ceramic synthesis. A vapor mixture containing vapors of at least two vaporizable constituents is first formed, wherein one of the constituents is a sodium fluoroalkoxide compound. The other constituent or constituents present in the vapor stream are vaporized compounds selected to provide other constituents of the desired composition for the glass or ceramic product, such as silica, $P_2O_5$, $B_2O_3$, $GeO_2$, MgO, ZnO, or the like. The proportions of vaporizable constituents present in the vapor stream are adjusted such that, when the constituents are reacted together in the vapor phase, a sodium-containing chemical vapor deposition product having the composition of the desired glass or ceramic is formed.

After a suitable vapor mixture has been formed, a chemical vapor reaction is initiated therein to generate a particulate sodium-containing vapor deposition product. The reaction is typically initiated by heating the vapor mixture. The particulate deposition product may be captured on a substrate as it is generated, or simply collected in loose form.

The captured or collected sodium-containing vapor deposition product is next heated, in the form captured or after suitable shaping as desired, to at least partially sinter the product to a unitary glass or ceramic article. Preferably, the product is heated to achieve complete sintering and consolidation to a non-porous glass or ceramic product.

The above-described method may be applied with particular benefit to the manufacture of high quality glasses. For that application stable, fully vaporizable source compounds are needed in order to obtain a homogeneous vapor deposition product of very fine particulate structure. For best glass quality, the deposited particles to be sintered to glass will preferably not exceed about 0.5 microns in diameter in an unagglomerated state.

To produce high quality glasses according to the invention, the proportions of vaporizable constituents present in the vapor stream are adjusted such that, when reacted together in the vapor phase, a vitrifiable sodium-containing chemical vapor deposition product having the composition of the desired glass product is produced. This deposition product need not be totally vitreous or amorphous as formed; however it must be capable of being converted to crystal-free glass by a suitable subsequent heat treatment.

DESCRIPTION OF THE DRAWING

The invention may be further understood by reference to the drawing, wherein.

DETAILED DESCRIPTION

Sodium fluoroalkoxides suitable for use in accordance with the invention are those which are relatively volatile and exhibit good stability at volatilization temperatures. For the purpose of the present invention, the sodium compound is sufficiently volatile if it can be vaporized without significant decomposition at some temperature below about 250° C., preferably below 200° C.

The sodium fluoroalkoxides used in accordance with the invention are of the general formula: Na—O—R, wherein O is oxygen and R is a fluorocarbon or fluorohydrocarbon group of from 3-5 carbon atoms. An example of a suitable fluorocarbon group is the perfluoro-t-butyl group, which is present in the compound sodium perfluoro-t-butoxide, Na(CF$_3$)$_3$CONa, having the molecular structure:

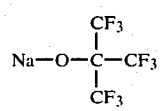

An example of a suitable fluorohydrocarbon group is the hexafluoroisopropyl group, which is present in the compound sodium hexafluoroisopropoxide, (CF$_3$CHOCF$_3$)Na, having the structure:

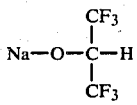

The fluorinated amyl groups, having 5 carbon atoms, also have the potential for forming volatile sodium fluoralkoxy compounds, based on the observed fact that non-fluorinated amyl compounds having volatilities equivalent to some non-fluorinated butyl compounds are known.

The chemical synthesis of sodium fluoroalkoxy compounds typically involves reaction of the corresponding fluorinated alcohol with a reactive sodium compound. The synthesis of two representative sodium fluoroalkoxy compounds is described in the following examples.

EXAMPLE I

Synthesis of Na(CF$_3$)$_3$CONa

In a three-necked flask equipped with an oxygen bubbler for purging, a 1.920 g sample of sodium hydride (from a 50% wt. dispersion of sodium hydride in a mineral oil) was washed repeatedly with ether to remove all oil. Fresh ether was then added to disperse the sodium hydride.

Thereafter, an ether mixture consisting of 5.5 ml of perfluoro-t-butanol and 15 ml of ether was slowly added through an addition funnel to the sodium hydride suspension. The perfluoro-t-butanol was commercially obtained from the PCR Corporation of Gainesville, FL.

Reaction between the sodium hydride and perfluoro-t-butanol occurred spontaneously with the evolution of hydrogen during the alcohol addition. Following the addition, the reaction mixture was stirred for two hours at room temperature, and the ether was then removed by vacuum. The product consisted of 7.5 g of a sublimable white powder, identified as (CF$_3$)$_3$CONa by infrared spectral and elemental chemical analyses.

Figure 1:
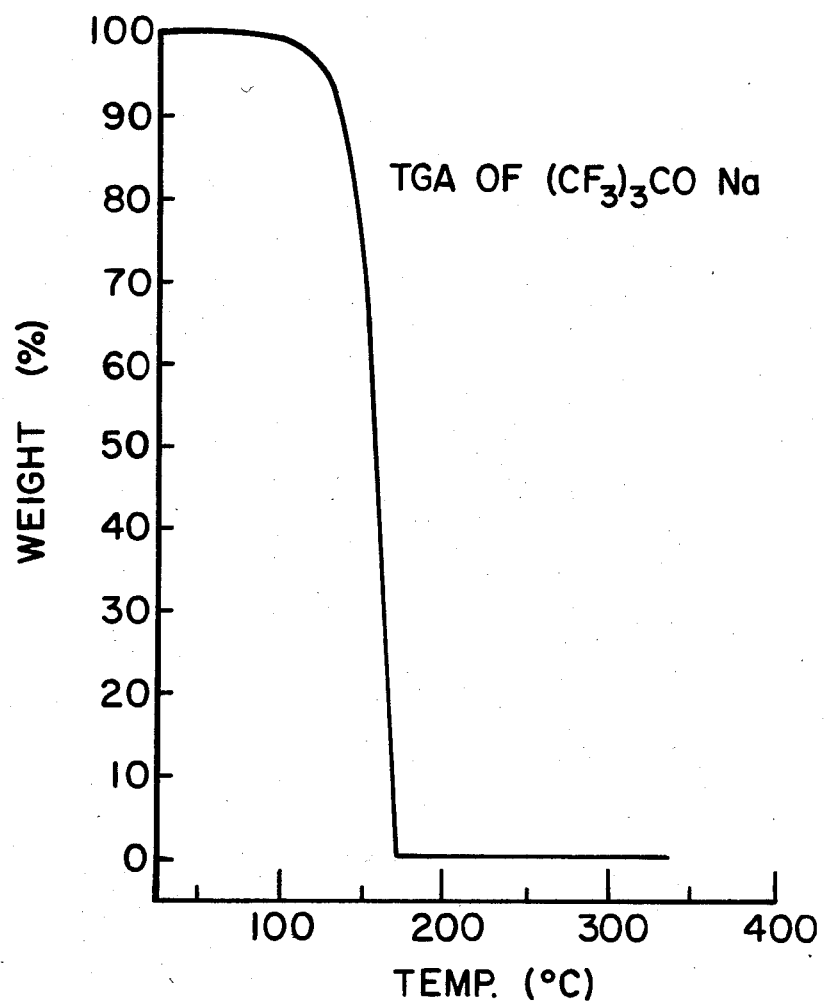
FIG. 1 is a thermogravimetric analysis curve for a sodium fluoroalkoxide compound useful in accordance with the invention.

A sample of (CF$_3$)$_3$CONa produced as described was subjected to thermogravimetric analysis (TGA). Heating of the compound was at 10° C./min under flowing argon. A TGA curve from such an analysis is reproduced in FIG. 1 of the drawing. That trace shows that complete volatilization of the compund occurs below about 170° C., with no evidence of thermal decomposition at any point in the vaporization range.

EXAMPLE II

Synthesis of Na(CF$_3$CHOCH$_3$)Na

In a three-necked flask equipped with an argon bubbler for purging, a 24 g sample of sodium hydride in oil, containing 0.5 moles (12 g) of pure sodium hydride, is washed with dry ether to remove the oil from the hydride. After two ether washings, 250 ml of fresh ether is added to the NaH in the flask, followed by the very slow addition over a two-hour interval of 84 g of hexafluoroisopropanol, $(CF_3)_2CHOH$. This addition was accompanied by a vigorous evolution of hydrogen. The hexafluoroisopropanol was purchased commercially from Columbia Organic Chemicals of Camden, SC.

Following the alcohol addition, the reaction mixture was stirred for 2 hours at room temperature, and the ether was then removed from the mixture by vacuum evaporation. The semi-product, initially a beige crystalline solid after ether evaporation, converted to a gummy, oily solid over the next 72 hours while stored under argon gas.

A proportion of this semiproduct was next transferred to a sublimator. After two successive sublimations, approximately 40 g of a white crystalline solid, identified as $(CF_3CHOCF_3)Na$ by elemental chemical analyses, was recovered.

This compound was subjected to thermogravimetric analysis following the procedure described in Example I. Rapid vaporization of the compound was observed over the 150°–200° C. temperature range, but with some decomposition. Approximately 10% by weight of the starting sample remained as non-volatile residue at 250° C. at the conclusion of the analysis. However, although this compound is not as stable as the perfluoro-t-butoxide, both $(CF_3CHOCF_3)Na$ and $(CF_3)_3CONa$ exhibit sufficient vapor pressure below 200° C. to constitute practical volatile source compounds for vapor phase glass synthesis.

The use of a sodium fluoroalkoxide compound for the synthesis of glass and ceramic products involves the vaporization and transport of the compound to the chemical vapor reaction zone in a manner analogous to the procedure used for supplying volatile source compounds in the prior art. Typically, the compound is placed in a heatable evaporator or bubbler, and a carrier gas is passed over or through the compound to pick up and transport compound vapors to the selected reaction site.

Figure 2:
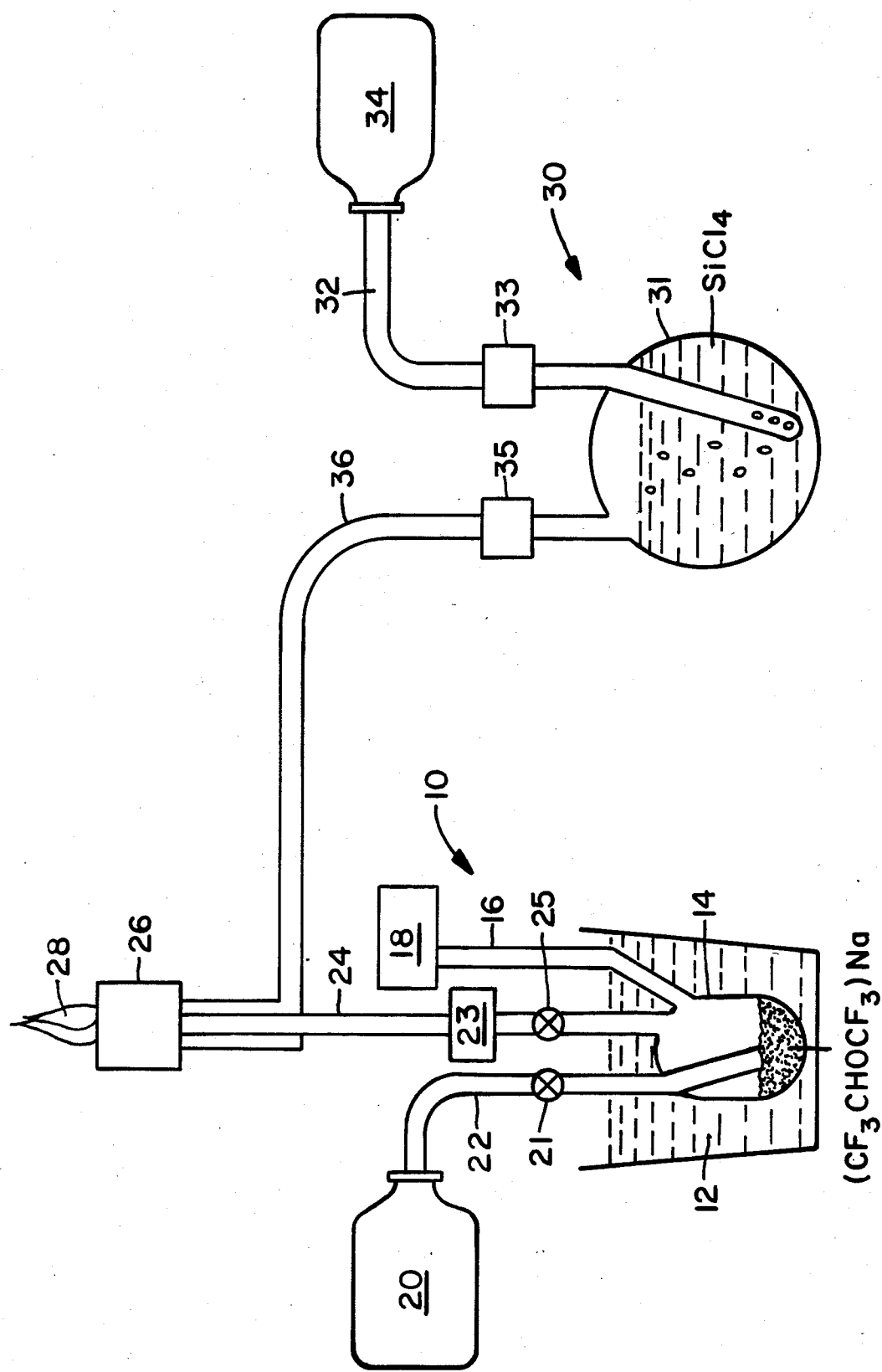
FIG. 2 is a schematic diagram of apparatus suitable for practicing the invention.

Apparatus suitable for synthesizing a sodium-containing silica glass in accordance with these principles is schematically illustrated in FIG. 2 of the drawing. Referring to FIG. 2, a vaporizer 10 for a suitable sodium fluoroalkoxide source material such as $(CF_3CHOCF_3)Na$ consists of an oil bath heater 12 containing a 3-necked glass vessel 14 in which a quantity of the selected source material is placed. Provision is made for evacuating the vessel, e.g., by connection via exhaust line 16 to a vacuum pump 18.

A gas supply 20 of an inert carrier gas such as argon is connected to the vessel through valve 21 and feed line 22, that feed line terminating within vessel 14 near the source material. The vessel is connected through valve 25 and delivery line 24 to burner 26, where vapors from the source material can be reacted with other reactants in flame 28. Delivery line 24 is typically heated to above the temperature of oil bath heater 12 so that condensation of the sodium fluoroalkoxide compound in the delivery line will not occur. The line preferably includes a flow controller 23 for monitoring and controlling the flow of gas through the line.

The glass synthesis apparatus of FIG. 2 also includes a source of another glass-forming constituent, in this case the liquid source material $SiCl_4$ which is supplied from bubbler 30. The bubbler includes a heatable tank 31 comprising a feed line 32 for introducing a carrier gas such as oxygen from carrier gas supply 34 into the tank. Feed line 32 extends into the $SiCl_4$ source material in tank 31 so that the carrier gas can be more fully saturated with $SiCl_4$ prior to transport out of the tank.

$SiCl_4$ vapors are transported from the bubbler to burner 26 via delivery line 36, which is preferably heated to the same temperature as delivery line 24 to avoid vapor condensation as the vapor streams from the two delivery lines are combined on exit from burner 26. Both delivery line 36 and carrier feed line 32 include flow controllers, 35 and 33 respectively, which monitor and/or control the flow of vapors to the burner.

The way in which the vapors of the sodium fluoroalkoxide compound and the other vaporizable constituents containing the chemical elements for the glass are combined into a mixture prior to reaction may be varied depending upon the reactivity of the vaporizable constituents to be employed. Where all vapors are relatively non-reactive with respect to each other at the necessary vapor generation and transport temperatures, the vapors may be combined and mixed prior to entering the reaction zone. For example, the vapors could be mixed within a flame oxidation burner such as burner 26 in FIG. 2, or they could be mixed within the delivery system, or they could be mixed within or generated from a mixture of source compounds within a bubbler or evaporator.

On the other hand, where premature reaction between the vapors is possible, it may be desirable to maintain certain vapors in separate vapor streams until those vapors are in close proximity to or actually within the vapor reaction zone. In general, premature chemical reactions among the vapor constituents are undesirable because they may cause condensation or precipitation of species containing the elements desired in the glass or ceramic product.

Figure 3:
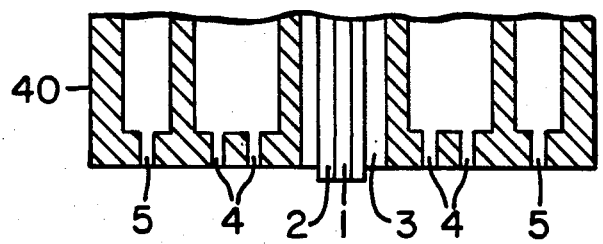
FIG. 3 is an enlarged schematic elevational view in cross-section showing the face of a burner suitable for producing a sodium-containing chemical vapor deposition product by flame oxidation.

Burner 26 of FIG. 2 can be selected to maintain the two vapor streams from the two delivery lines separate up to the point where they enter the reaction zone at flame 28. An enlarged partial schematic elevational view in cross-section of a suitable configuration for the face section of such a burner is illustrated in FIG. 3 of the drawing. In that illustration, burner face 40 comprises exit orifices 1 and 2, which could be extensions of delivery lines 24 and 36 in apparatus such as shown in FIG. 2, and which deliver, respectively, sodium fluoroalkoxide vapors and $SiCl_4$ vapors from the burner face. Exit orifices 3, 4 and 5 would deliver additional gases for the chemical vapor phase synthesis reaction, typically comprising oxygen from ring orifice 3, a fuel gas/oxygen mixture from discrete circular orifices 4, and additional oxygen from discrete circular orifices 5. Using this delivery arrangement, the source compound vapors $SiCl_4$ and sodium fluoroalkoxide are maintained in separate vapor streams until combined in the gas-oxygen burner flame which constitutes the chemical vapor reaction zone for the process.

While the apparatus shown in FIGS. 2 and 3 utilizes flame oxidation as the chemical vapor reaction which generates the sodium-containing vapor deposition product, other reaction types and procedures could alternatively be employed. The reaction could, for example, be carried out in a containment tube or enclosure rather than in an open environment, and could be driven by an external heat source such as a flame or laser, or by a contained plasma. However, flame oxidation is the reaction mode presently preferred for the production of oxide glasses and particularly for the production of sodium-containing silicate glasses in accordance with the invention.

The method of the invention is particularly well suited to the manufacture of sodium-doped fused silica, i.e., high-silica glass containing small quantities of sodium as a dopant to soften or otherwise modify the properties of the fused silica. The preparation of a sodium-doped fused silica glass in accordance with the method of the invention is illustrated by the following example.

EXAMPLE 3

Na-doped fused silica synthesis

Referring to apparatus such as schematically illustrated in FIG. 2, a 25 g sample of $(CF_3CHOCF_3)Na$ is loaded under argon into an evaporator 14, and the evaporator is evacuated and purged with argon several times to remove residual air.

A charge of $SiCl_4$ is introduced into glass bubbler 31, which is heated and maintained at 40° C. Heating tape is applied to delivery line 36 connecting the bubbler 31 with the flame oxidation burner 26, and also to delivery line 24 connecting the evaporator 14 with the burner. Both delivery lines are then heated to and held at 200° C.

Oil bath 12 is next heated to its operating temperature of 120° C., a temperature at which the $(CF_3CHOCF_3)Na$ source compound is not melted, but has an appreciable vapor pressure and does not rapidly decompose. Argon flow is then commenced from argon source 20 through evaporator 14 and over the $(CF_3CHOCF_3)Na$ source compound at 0.1 standard liters per minute (slm). At the same time, a flow of oxygen is commenced from oxygen source 34 through the $SiCl_4$ in bubbler 31 at a rate of 0.4 slm.

The resulting vapor streams are fed simultaneously through heated delivery lines 24 and 36 toward flame oxidation burner 26, which is operating on a methane/oxygen mixture supplied at 3.52 slm $CH_4$ and 3.31 slm $O_2$. Referring to FIG. 3, illustrating a suitable design for burner 26, the $CH_4/O_2$ mixture is supplied for combustion through orifices 4, while the $SiCl_4$ and $(CF_3CHO CH_3)Na$ vapors are separately supplied to the combustion zone as concentric streams through concentric fume tubes 2 and 1, respectively. During the combustion of these vapors, additional oxygen is supplied to the flame, at a flow rate of 0.150 slm through orifice 3 and at a rate of 3 slm through orifices 5. During the flame oxidation reaction of the sodium source compound, a bright yellow-orange emission from the flame, characteristic of sodium d-line emission, is observed.

The soot resulting from the oxidation of these source compounds is captured on a rotating quartz bait rod (not shown) traversing the soot stream issuing from the burner flame. Chemical analysis of this soot at the conclusion of the run identifies the product as a sodium-doped fused silica soot containing approximately 0.024% $Na_2O$, remainder $SiO_2$, by weight.

A glass article can be formed from sodium-doped fused silica soot produced as described in this Example by fusing the soot deposit as collected on the bait rod. Alternatively, the soot can be removed from the rod and shaped into a desired preform configuration by any suitable method prior to sintering to clear glass.

To produce oxide glasses containing higher concentrations of $Na_2O$, e.g., sodium aluminosilicate glasses, higher evaporator temperatures and/or carrier gas flows may be utilized, most preferably with a sodium fluoroalkoxide compound of even higher stability and volatility. For example $(CF_3)_3CONa$ might be used in preference to sodium hexafluoroisopropoxide in these applications, despite its higher cost, due to the higher vapor pressure at equivalent vaporization temperatures and better thermal stability at such temperatures offered by this compound.

Alternative techniques for increasing the Na content of the deposited glass, where desired, would be to use relatively lower $SiCl_4$ flow rates and/or to reduce possible $Na_2O$ sublimation loss from the deposition zone. The latter would be minimized by using lower flame temperatures or collecting the soot product at a point distinct from the reaction burner.

A specific application for the invention wherein the use of $Na(CF_3)_3CO$ would be particularly advantageous would be in the synthesis of sodium aluminosilicate ($Na_2O$—$Al_2O_3$—$SiO_2$) glasses containing substantial proportions of $Na_2O$. These glasses are of particular interest because they are expected to exhibit exceptionally low Rayleigh scattering at infrared wavelengths. Table I below sets forth examples of such glasses, including compositions in weight percent, measured Rayleigh scattering losses for 0.488 um visible light, and calculated Rayleigh scattering losses at 1.55 um in the infrared region of the spectrum. Also shown in Table I are corresponding data for a pure fused silica glass.

TABLE I

|  | 1 | 2 | 3 | 4 | 5 |
|---|---|---|---|---|---|
| Composition (% wt.) |  |  |  |  |  |
| $SiO_2$ | 100 | 60 | 50 | 45 | 65 |
| $Al_2O_3$ | — | 10 | 20 | 35 | 15 |
| $Na_2O$ | — | 30 | 30 | 30 | 30 |
| Scattering Loss (dB/km) |  |  |  |  |  |
| at 0.488 μm | 9.6 | 8.0 | 4.9 | 5.3 | 5.4 |
| at 1.55 μm | 0.094 | 0.079 | 0.048 | 0.052 | 0.053 |

To prepare glasses of $Na_2O$—$Al_2O_3$—$SiO_2$ composition such as shown in Table I, containing relatively large proportions of $Na_2O$ and $Al_2O_3$, a $Na(CF_3)_3CO$ source compound in combination with a suitably volatile aluminum source compound such as $Al(hfa)_3$ could be used to provide the vapor mixture for the glass synthesis reaction. An alternative Al source would be an $AlCl_3$ vapor generator.

Sodium fluoroalkoxide compounds are also expected to be suitable sodium source materials for the synthesis of metal halide glasses. Hence, using the methods described in U.S. Pat. No. 4,378,987, a sodium fluoroalkoxide compound could constitute a suitable organometallic sodium source compound which could be vapor-reacted with a halogenating agent such as HF to produce pure sodium fluoride. This pure sodium fluoride, when deposited with appropriate halide glass-formers such as $BeF_2$, $ZnF_2$, $ZnCl_2$ or the like, could provide sodium-containing, vapor-deposited halide glass products of exceptional purity.

We claim:
1. A method for making a sodium containing glass article which comprises the steps of:
   (a) forming a vapor reaction mixture containing vapors of at least two vaporizable constituents which react together in the vapor phase to form a composition for a vapor-deposited glass, wherein one of the vaporizable constituents is a sodium fluoroalkoxide compound;

(b) initiating a chemical vapor deposition reaction in the vapor mixture to generate a particulate sodium-containing vapor deposition product, and collecting the vapor deposition product; and (c) heating the vapor deposition product to at least partially sinter said deposition product to a sodium-containing glass product.

2. A method in accordance with claim 1 wherein the mixture of vaporizable constituents react together in the vapor phase to form a vitrifiable composition, and wherein the sodium-containing vapor deposition product is heated to sinter it to a non-porous sodium-containing glass.

3. A method in accordance with claim 2 wherein the glass is a sodium-doped fused silica glass consisting essentially of $Na_2O$ and $SiO_2$.

4. A method in accordance with claim 2 wherein the glass is a sodium aluminosilicate glass which consists essentially of $Na_2O$, $Al_2O_3$ and $SiO_2$.

5. A method in accordance with claim 2 wherein the sodium fluoroalkoxide compound has a volatility such that it can be vaporized without significant decomposition at some temperature below 250° C.

6. A method in accordance with claim 5 wherein the sodium fluoroalkoxide compound is of the formula:

$$Na-O-R$$

wherein O is oxygen and R is a fluorocarbon or fluorohydrocarbon group of from 3–5 carbon atoms.

7. A method in accordance with claim 6 wherein the sodium fluoroalkoxide compound is selected from the group consisting of sodium hexafluoroisopropoxide and sodium perfluoro-t-butoxide.

* * * * *